(12) United States Patent
Safir

(10) Patent No.: US 8,202,035 B2
(45) Date of Patent: Jun. 19, 2012

(54) METHOD AND INSTALLATION FOR AUTOMATIC PROCESSING OF BAGGAGE

(75) Inventor: André Safir, Garches (FR)

(73) Assignee: SBS (FR)

( * ) Notice: Subject to any disclaimer, the term of this patent is extended or adjusted under 35 U.S.C. 154(b) by 1075 days.

(21) Appl. No.: 11/576,790

(22) PCT Filed: Jul. 12, 2005

(86) PCT No.: PCT/FR2005/001804
§ 371 (c)(1),
(2), (4) Date: Feb. 8, 2008

(87) PCT Pub. No.: WO2006/040421
PCT Pub. Date: Apr. 20, 2006

(65) Prior Publication Data
US 2008/0267751 A1    Oct. 30, 2008

(30) Foreign Application Priority Data

Oct. 8, 2004  (FR) .................................. 04 10646
Oct. 8, 2004  (FR) .................................. 04 10647

(51) Int. Cl.
*B65G 67/00* (2006.01)

(52) U.S. Cl. ........................ 414/347; 414/812

(58) Field of Classification Search ................ 414/273, 414/347, 343, 812
See application file for complete search history.

(56) References Cited

U.S. PATENT DOCUMENTS

| | | | |
|---|---|---|---|
| 3,263,832 A * | 8/1966 | Williams, Jr. et al. | 414/344 |
| 3,356,236 A * | 12/1967 | Shaw et al. | 414/398 |
| 3,655,076 A | 4/1972 | Carder et al. | 214/38 |
| 3,727,581 A * | 4/1973 | Brent | 119/453 |
| 3,804,274 A * | 4/1974 | Johnson | 414/344 |
| 4,050,655 A * | 9/1977 | Bogue et al. | 244/137.1 |
| 4,492,504 A * | 1/1985 | Hainsworth | 414/273 |
| 4,993,915 A * | 2/1991 | Berger et al. | 414/796.9 |
| 6,347,604 B1 * | 2/2002 | Lapere et al. | 119/843 |
| 6,503,043 B1 * | 1/2003 | Smith et al. | 414/331.14 |
| 6,520,735 B2 * | 2/2003 | Fallin et al. | 414/807 |
| 6,702,542 B1 | 3/2004 | Chance et al. | 414/347 |
| 7,101,138 B2 * | 9/2006 | Fosnight et al. | 414/222.11 |

FOREIGN PATENT DOCUMENTS

DE    196 37 949    3/1998

OTHER PUBLICATIONS

International Search Report PCT/FR2005/001804 dated Mar. 28, 2006.

\* cited by examiner

*Primary Examiner* — Charles A Fox

(74) *Attorney, Agent, or Firm* — Ostrolenk Faber LLP

(57) ABSTRACT

The invention concerns an installation and a method for automatically processing individual hand-held bags between two storage areas, the bags respectively having a base surmounted by two opposed lateral flanks, said bags being adapted to rest in equilibrium on their base, said bags being transferred from one storage area to the other via a longitudinal transfer platform, as claimed in the invention, the installation comprises: means for forming rows of bags resting on their base on one of said storage areas; means for driving each of said rows in translation in a first direction over said longitudinal transfer platform; and means for driving each of said rows of bags supported by said platform in translation in a second direction substantially perpendicular to said first direction to transfer said row of bags to the other storage area.

18 Claims, 6 Drawing Sheets

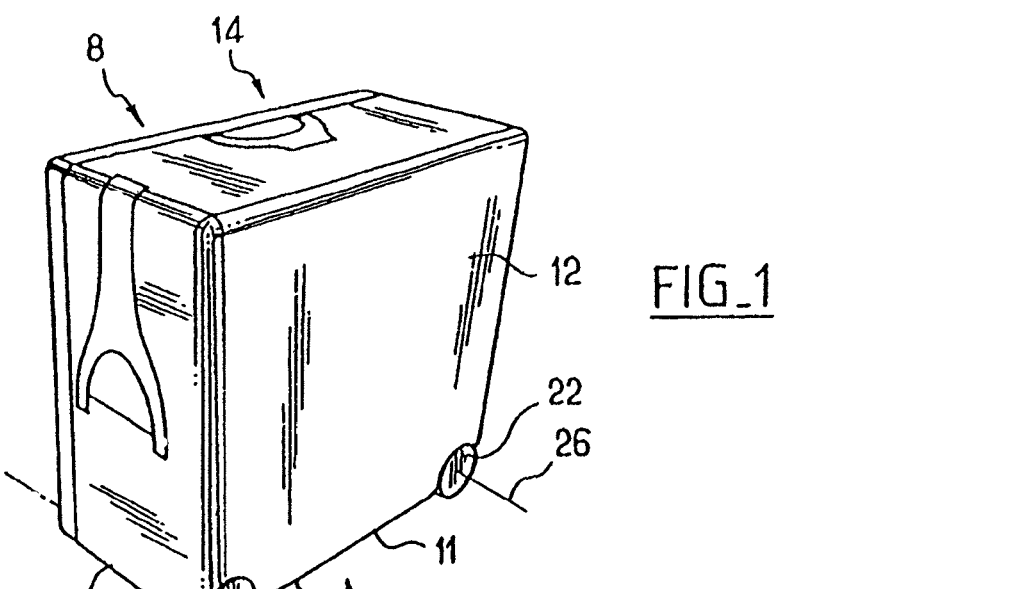
FIG_1
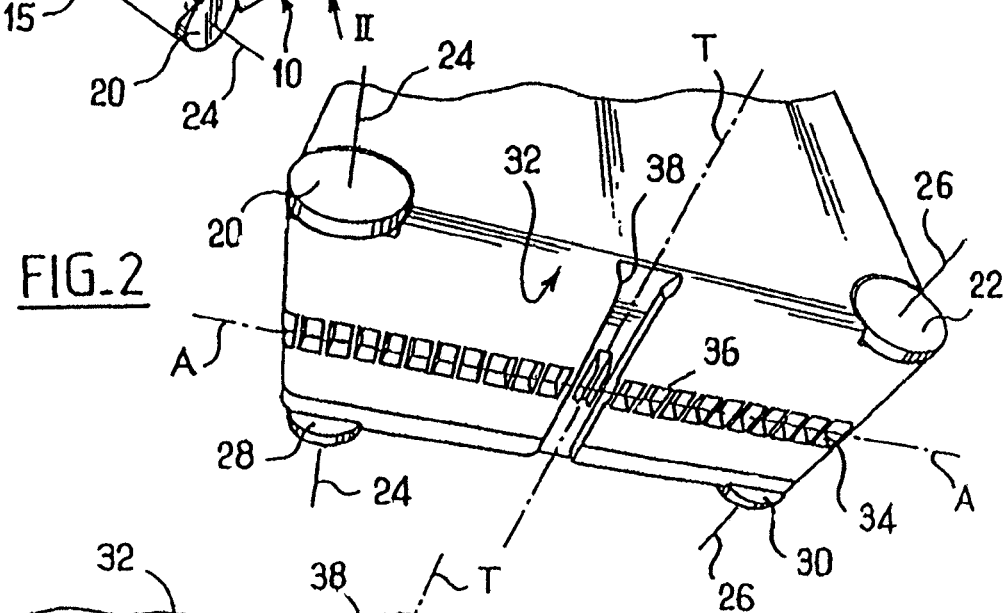
FIG_2
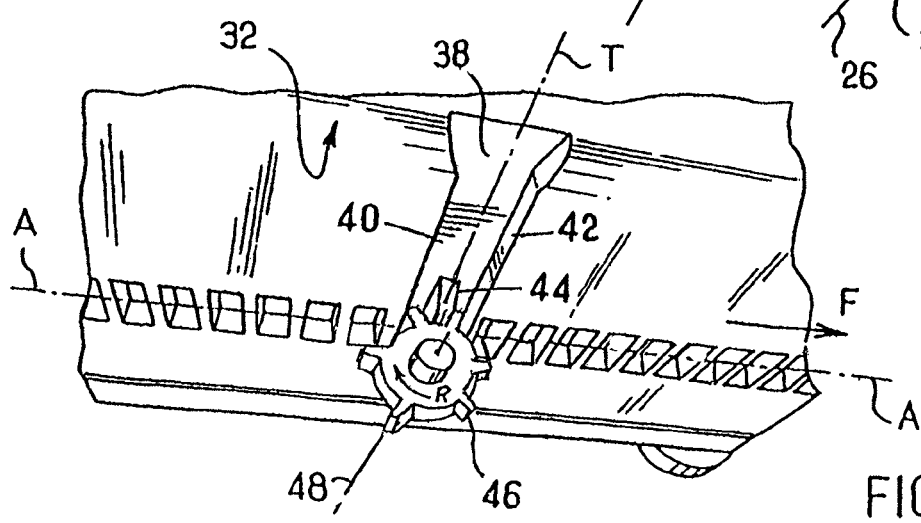
FIG_3

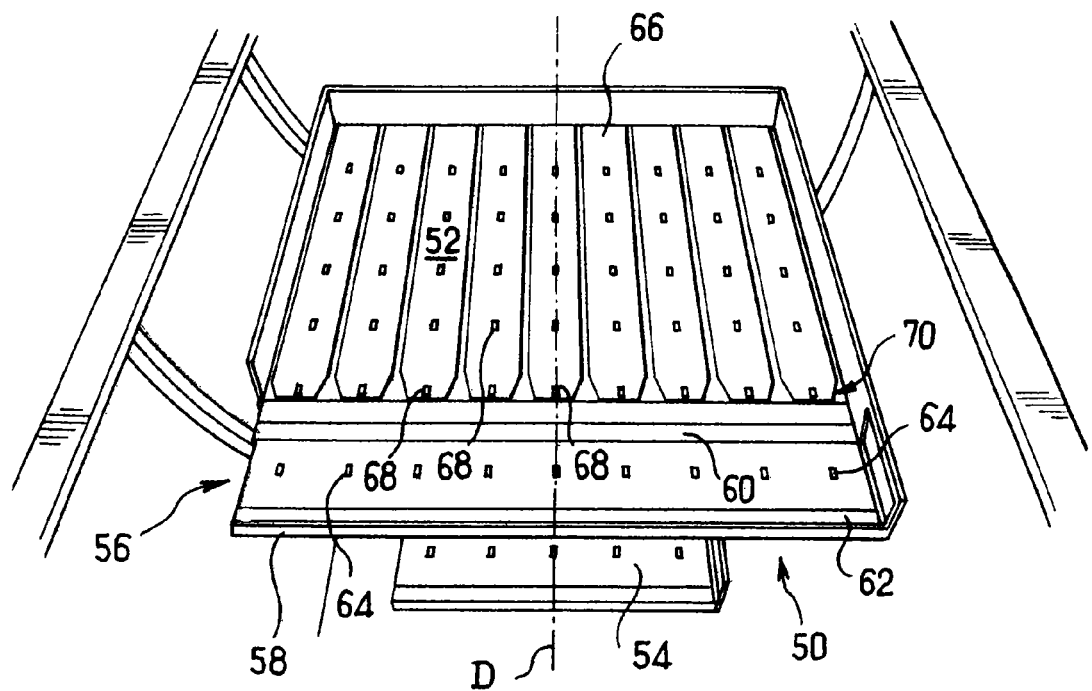
FIG._4
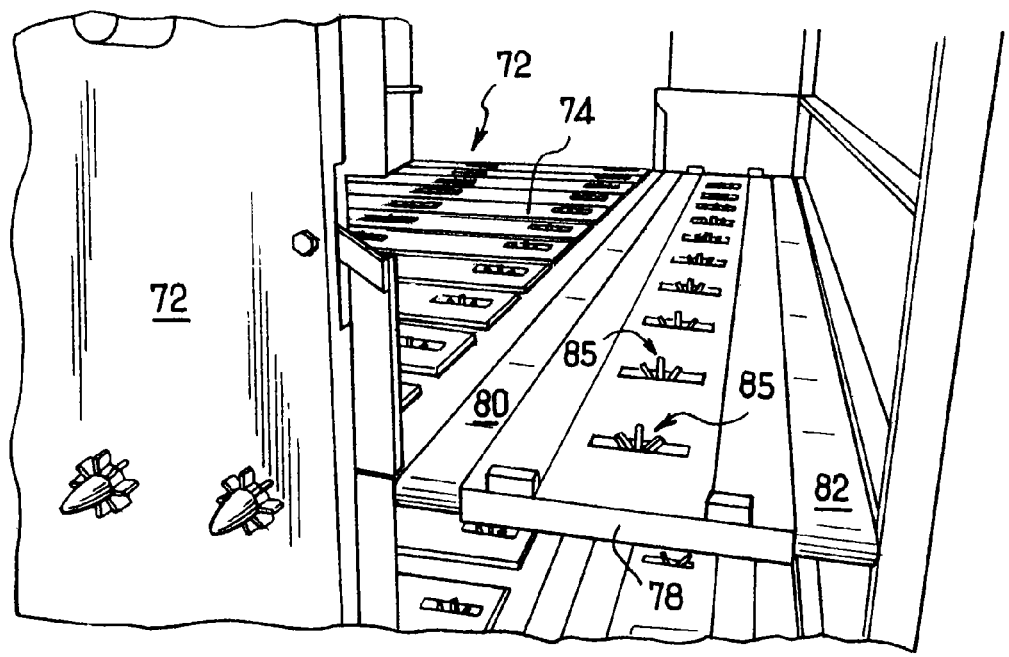
FIG._5

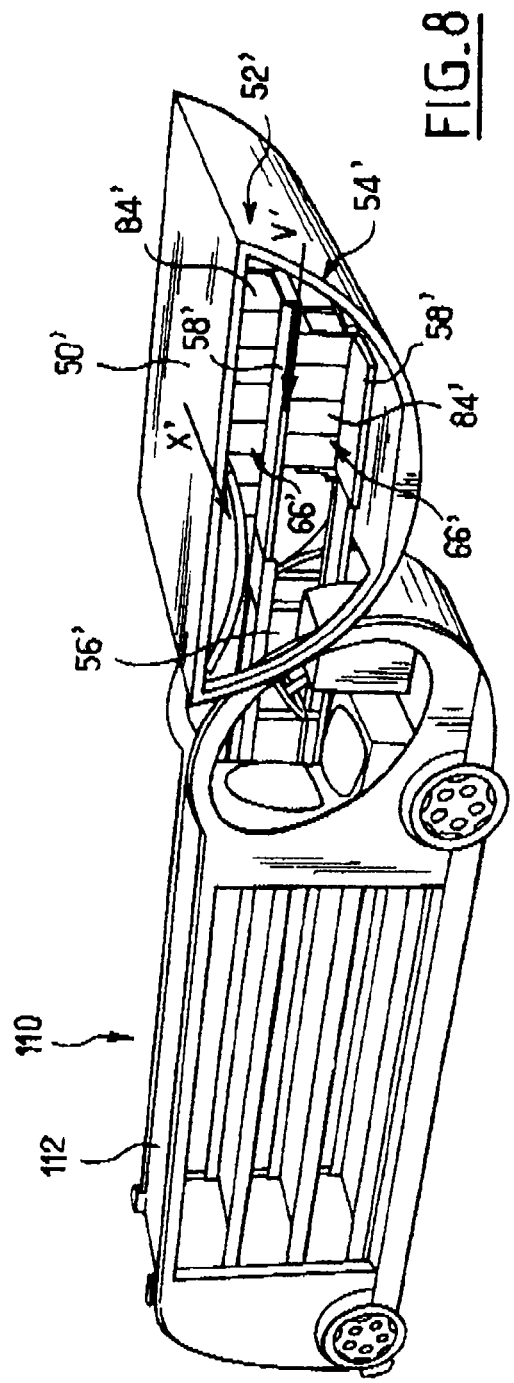
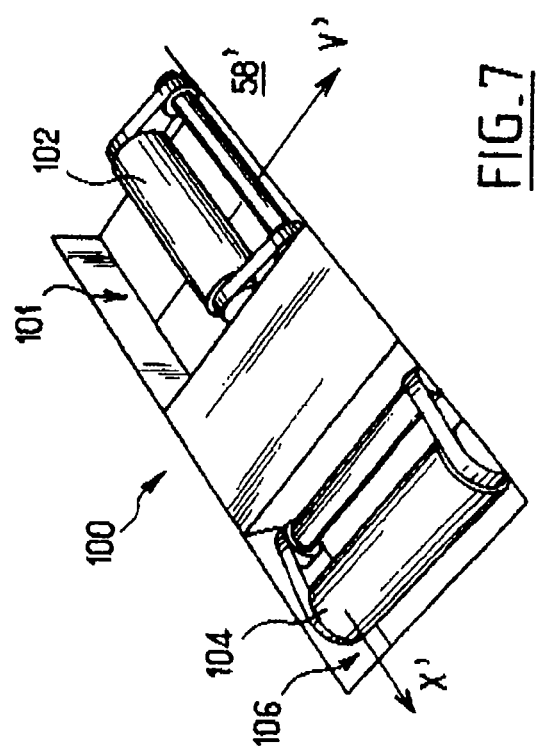
FIG_8
FIG_7

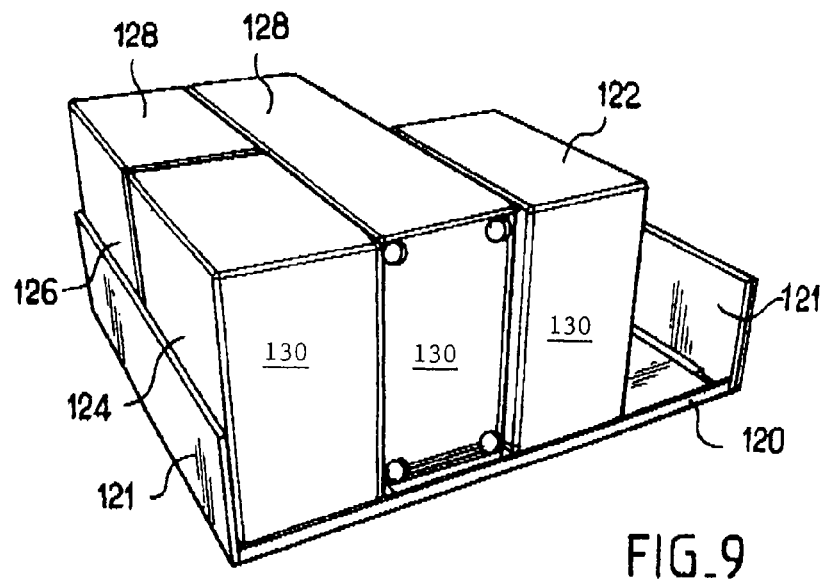
FIG_9
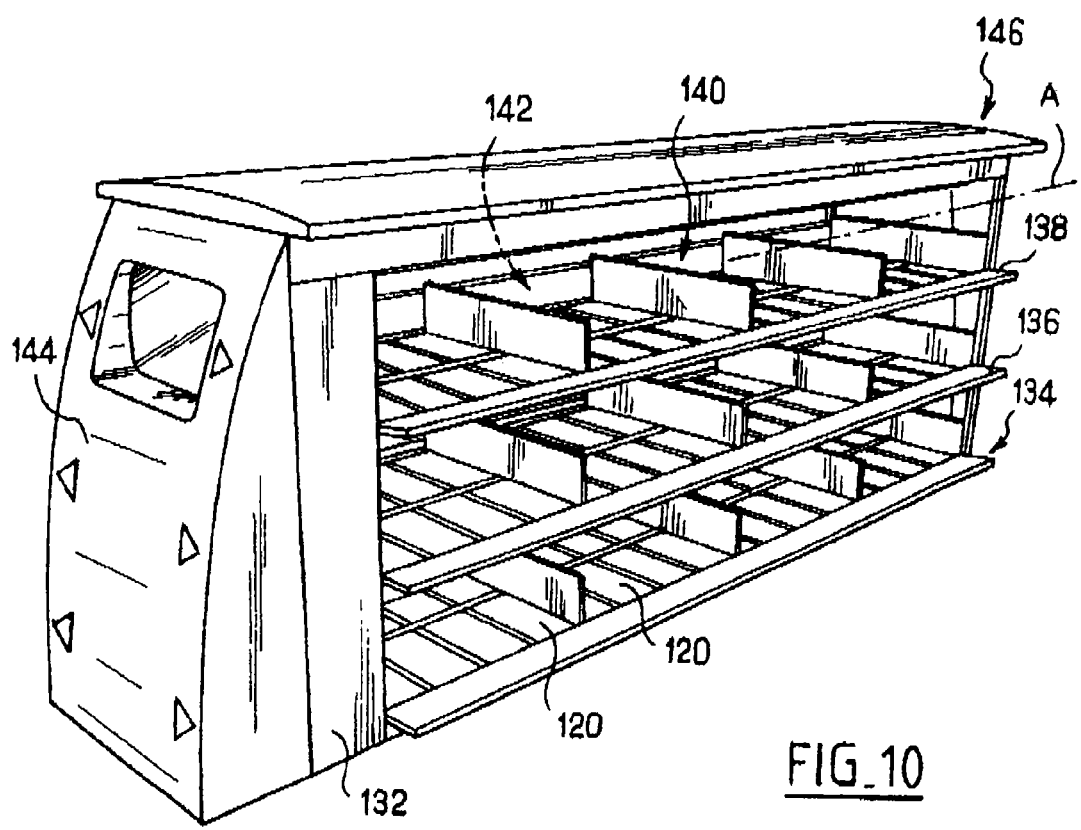
FIG_10

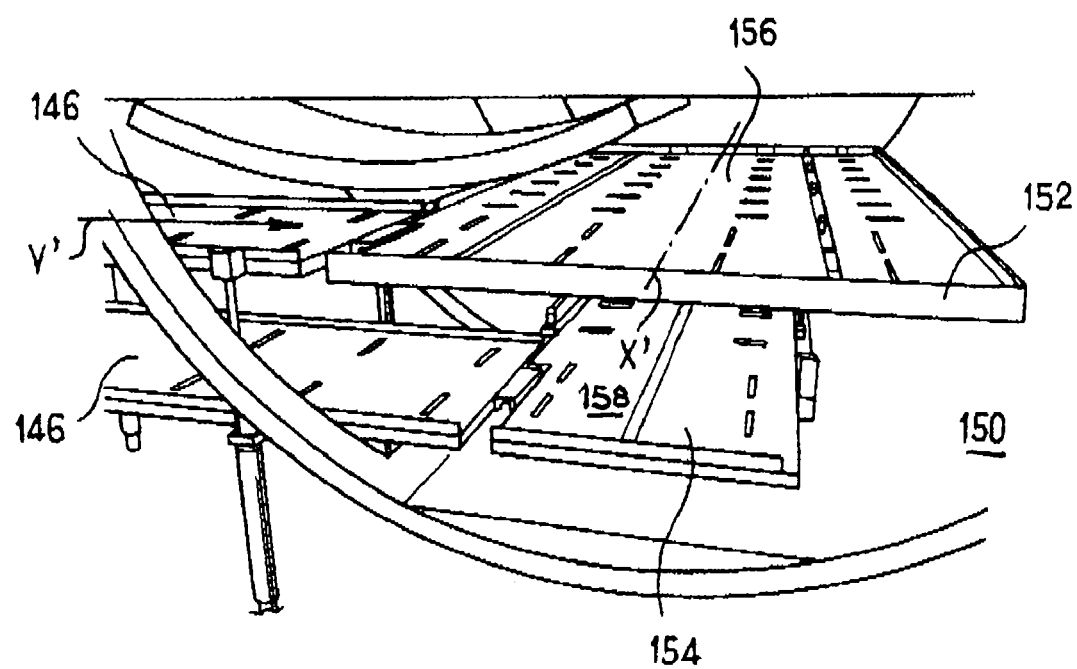
FIG_11

METHOD AND INSTALLATION FOR AUTOMATIC PROCESSING OF BAGGAGE

CROSS REFERENCE TO RELATED APPLICATION

The present application is a 35 U.S.C. §§371 national phase conversion of PCT/FR2005/001804, filed 12 Jul. 2005, which claims priority of French Patent Application No 0410646 filed 8 Oct. 2004, and French Patent Application No 0410647 filed 8 Oct. 2004 the disclosures of which are herein incorporated by reference. The PCT Application was published in the French Language.

BACKGROUND OF THE INVENTION

The present invention relates to an installation for automatic processing of baggage.

One field of application envisaged is in particular that of air transport for which it is necessary to transfer individual bags manually between an air terminal and the hold of an aircraft.

The bags are generally of parallelepipedal shape and have a base surmounted by two opposed lateral flanks spaced by a distance corresponding to the thickness of the bag.

With the aim of reducing aircraft turnaround times, it is necessary for the transfer of bags between the aircraft and the air terminal to be carried out in a short a time as possible and with means of the lowest possible cost.

Thus the bags are usually fed along conveyor belts themselves guided in translation on transfer platforms in particular, over at least portions of the conveyor path that extends from the check-in area to the aircraft. These conveyor belts are either formed of rectilinear sections, disposed end to end and inclined relative to each other in the case of the non-rectilinear portions of the conveyor path, each of the sections having a belt driven by a drive roller, or formed of a single belt consisting of plates adapted to pivot relative to each other in a common plane and driven together along a route that is not necessarily rectilinear.

However, such devices cannot be implemented continuously between said check-in area and the hold of an aircraft, given the distance that may separate them. Consequently, handling operations are necessary for transferring the bags onto a trolley that is then taken to the aircraft, where the bags are again transferred manually, from the trolley to the hold. These transfer operations are laborious, time-consuming and costly. Moreover, the bags are conveyed in a somewhat anarchic manner on these conveyor belts with the result that the available space is not occupied to the optimum.

A problem that arises and that the present invention aims to solve is then of providing an installation not only for automating the conveying of baggage but also for limiting the space necessary for processing the baggage.

SUMMARY OF THE INVENTION

To achieve this object, a first aspect of the present invention proposes a method for automatically processing individual hand-held bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags; the method according to the invention comprises the following steps: rows of bags resting on their base are formed on one of said storage areas, the bags of each of said rows being pressed one against the other, flank to flank and in a direction substantially normal to said flanks; each of said rows is driven sequentially in translation in a first direction over said longitudinal transfer platform so that each of said rows of bags extends longitudinally on said platform; and each of said rows of bags supported by said platform is driven in translation in a second direction substantially perpendicular to said first direction to transfer said rows of bags to the other storage area.

Thus one feature of the invention resides in the manual manner of placing the bags in rows, flank against flank, which thereafter enables the bags to be driven sequentially in translation block by block, in two perpendicular directions. As a result, the bags of each block can be transferred from a transfer platform to a receiver platform, and vice-versa, without human intervention and in a relatively small space since the bags are grouped together bearing one against the other.

According to one particularly advantageous embodiment of the invention, said first direction is substantially perpendicular to the flanks of the bags of said row, while said second direction is substantially parallel to the flanks of the bags of said row, with the result that the rows of bags are driven in translation over the transfer platform at one of its ends and in a direction parallel to said platform, said row of bags then extending over all of the length of said platform.

Furthermore, said other storage area is situated in an aircraft and said one storage area is situated outside said aircraft, with the result that, said transfer platform being situated transversely in the hold of the aircraft, it is adapted to receive said rows of bags from the exterior of the aircraft in said first direction, so that said rows are then driven in said hold transversely relative to said transfer platform and said rows.

Moreover, said bags preferably having two opposed edge walls respectively connecting said lateral flanks, said two edge walls and said lateral flanks being surmounted by a holding wall opposite said base, said rows of bags are formed one above the other and at a distance leaving said holding wall and at least one of said edge walls of each of said bags free, so that, on the one hand, said bags may be stowed manually and form said rows and, on the other hand, and conversely, said bags can be removed manually from said row. Additionally, said rows of bags are matched so that the edge walls of the bags of the matched rows are facing, so that, as will be explained in the remainder of the description, said matched rows can be driven sequentially and the speeds of transfer of the bags further increased and also to rationalize the space occupied by said bags.

Another aspect of the invention proposes an installation for automatically processing individual hand-held bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags; according to the invention, said installation comprises: means for forming rows of bags resting on their base, on one of said storage areas, the bags of each of said rows being pressed one against the other, flank to flank and in a direction substantially normal to said flanks; means for driving each of said rows sequentially in translation in a first direction over said longitudinal transfer platform, so that each of said rows of bags extends longitudinally on said platform; and, means for driving each of said rows of bags supported by said platform in translation in a second direction substantially perpendicular to said first direction to transfer said row of bags to the other storage area.

Thus, according to this other aspect, one feature of the invention resides in the mode of cooperation of the means that first enable the rows of bags to be formed on one of the storage areas, for example situated outside an aircraft, and then to be driven in a first direction over the longitudinal transfer platform, and then to be driven again, in a second direction perpendicular to the first, off said transfer platform and towards the other storage area, for example situated inside said aircraft. Such an installation furthermore lends itself to complete automation of the transfer of baggage from an air terminal to an aircraft.

According to another particularly advantageous embodiment of the invention, said bags having two opposed edge walls respectively connecting said lateral flanks, said two edge walls and said lateral flanks being surmounted by a holding wall opposite said base, said installation comprises a stowage rack for forming said rows of bags one above the other and at a distance leaving said holding wall and at least one of said edge walls of each of said bags free. Thanks to the stowage rack, situated resting on the ground in one storage area outside the aircraft, for example, the bags can therefore be stowed manually, flank pressing against flank and in rows, for example by the persons carrying the bags themselves. As a result, the bags are stowed rationally and manually by the persons carrying them, so that they can then be processed automatically without human intervention, and in particular so as to be transferred into the hold of the aircraft in rows, after the stowage rack has been conveyed to the aircraft by means of an automobile vehicle. Moreover, and as will be explained in the remainder of the description, the bags can be removed easily by the operators themselves, in this same position after they have been transferred automatically in rows, this time, from the hold to another identical stowage rack, after the aircraft lands.

Moreover, and in a particularly advantageous manner, said stowage rack extends along a longitudinal axis and comprises at least two superposed levels and at least one open lateral bay, so that bags can be stowed manually flank against flank on said levels via said bay so that the flanks of said bags are substantially perpendicular to said axis so as to form said rows. As a result, the two levels, being spaced from each other by a significantly greater distance than the bags, and the first level itself extending close to the ground, the persons carrying the bags can without difficulty load their bags through the open bay to form the rows. A third level may be provided, for example, for stowing other rows of bags and thus to rationalize even more the space occupied on the ground.

Moreover, and in a preferred embodiment, said stowage rack comprises two opposed open lateral bays on each side, so that bags can be stowed manually via each of said bays on each side of the stowage rack to match up said rows.

According to an advantageous feature of the invention, the installation comprises longitudinal driving means for driving said rows substantially perpendicularly to the flanks of the bags of said rows, in particular to drive said rows toward and onto said transfer platform in a direction parallel to the latter, said longitudinal driving means being adapted to drive said rows of bags in said first direction. It will be noted that these longitudinal driving means also drive the rows initially supported by said platform in translation outside said platform.

In one embodiment, said longitudinal driving means comprise at least two substantially parallel conveyor belts spaced from each other, on which the rows of bags may rest, all the bags of said rows being simultaneously supported on both the conveyor belts.

According to another advantageous feature of the invention, said installation comprises transverse driving means for driving said rows transversely, said transverse driving means being adapted to drive said rows of bags in said second direction which is substantially perpendicular to said platform. Whereas said longitudinal driving means are essentially adapted to drive the rows of bags between the exterior of the hold of an aircraft and the transfer platform that is housed inside it, and vice-versa, the transverse transfer means are adapted to drive the rows of bags between the receiver platform situated inside the hold and the transfer platform and vice-versa.

In one embodiment, the transverse driving means comprise rotary driving means adapted to interengage in said bases to drive simultaneously each of the bags of said row of bags so as to drive as a whole all of the row initially formed, the row of bags then remaining complete. For example, said bases comprise a rectilinear toothed portion and said rotary drive means include driving pinions adapted to mesh in said rectilinear toothed portion. As a result, the driving pinions that are directly linked to the base drive the bags in translation rigidly.

Furthermore, said bags advantageously having an identical thickness, said transfer platform is equipped with a plurality of consecutive rotary driving means spaced longitudinally by a distance corresponding to said thickness so that said row of bags can rest on the transfer platform in a position such that each of said bags of said row can each be driven by respective rotary driving means so as thus to drive said row transversely. To this end, it is preferable if said rotary drive means of said plurality of rotary drive means are connected together by a single common drive shaft.

Moreover, and in one particularly advantageous embodiment of the invention, the installation according to the invention further comprises transfer pallets adapted to receive said rows of bags, said transfer pallets being mounted to be mobile in translation in said stowage rack so as not to drive a single row but two parallel matched rows, which on the one hand speeds up the processing of said rows and additionally circumvents any variations in dimensions between the bags of each of said rows. Obviously, these transfer pallets are adapted to be driven in translation from the stowage rack to the transfer platform situated inside the hold, then from the transfer platform to the receiver platform in a substantially perpendicular direction.

Other features and advantages of the invention will emerge from a reading of the following description of particular embodiments of the invention, given by way of illustrative and nonlimiting example, with reference to the appended drawings, in which:

BRIEF DESCRIPTION OF THE DRAWINGS

FIG. 1 is a diagrammatic perspective view of a bag adapted to an installation according to a first embodiment of the invention;

FIG. 2 is a diagrammatic partial perspective view showing the bag shown in FIG. 1 from a different angle;

FIG. 3 is a diagrammatic partial view showing a complementary element adapted to cooperate with said bag;

FIG. 4 is a diagrammatic partial perspective view from above of a first installation according to the invention;

FIG. 5 is a diagrammatic partial perspective view of a second installation according to the invention;

FIG. 7 is a diagrammatic detail perspective view of an installation according to another embodiment of the invention;

FIG. 8 is a diagrammatic partial perspective view of an installation according to the other embodiment;

FIG. 9 is a diagrammatic detail perspective view of the invention shown in FIG. 8, according to a different embodiment;

FIG. 10 is a diagrammatic perspective view of another detail according to the aforementioned other embodiment; and FIG. 11 is a diagrammatic perspective view of a further detail according to said aforementioned other embodiment.

Figure 6:
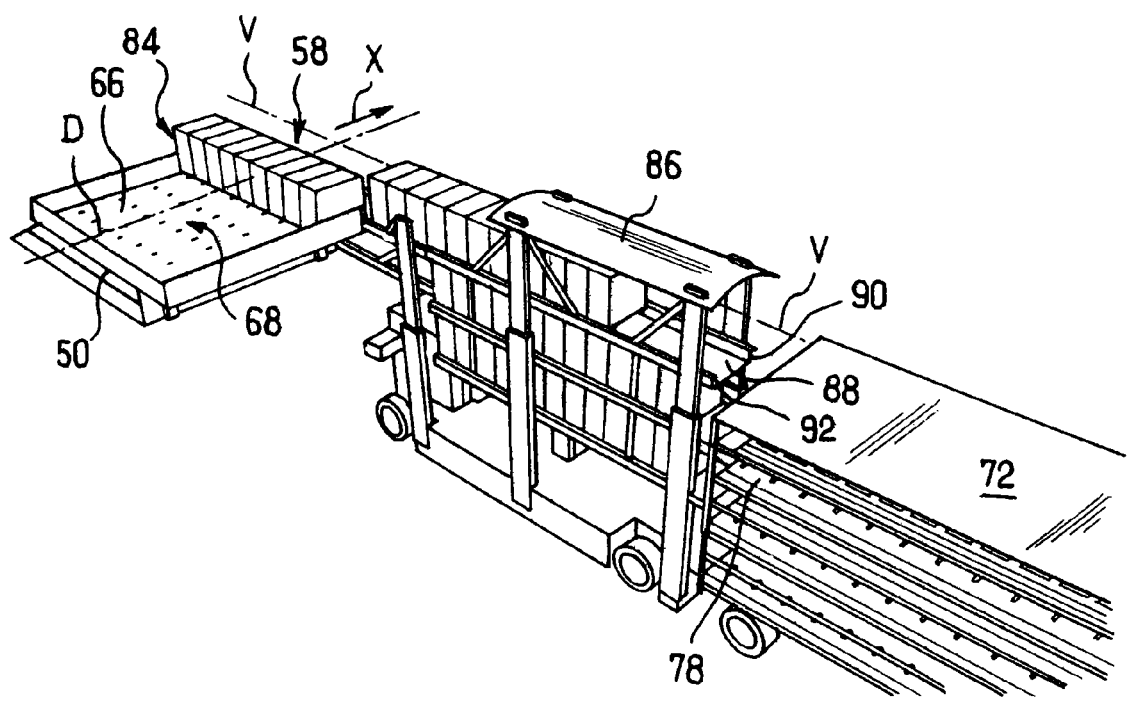
FIG. 6 is a diagrammatic partial perspective view showing the first and second installations represented in FIGS. 4 and 5.

It will be noted that certain references consist of a number assigned the prime symbol: "'". These references simply correspond to functionally equivalent elements used in different embodiments.

DESCRIPTION OF A PREFERRED EMBODIMENT

FIG. 1 shows a rectangular parallelepiped-shaped bag 8 adapted to be processed in an installation according to the invention. The bag 8 has a base 10 surmounted by two opposed lateral flanks extending longitudinally along a length 11, a first lateral flank 12 being apparent in FIG. 1 and a second lateral flank 14 being concealed, the two lateral flanks 12, 14 being substantially parallel to each other and spaced from each other by a thickness 15 of the bag 8. Furthermore, there is also apparent in FIG. 1, in a lower portion of the bag, two bearing surfaces formed of two first rolling members 20, 22 rotatably mounted in two corners of the base 10 about two respective transverse axes 24, 26. The other two corners of the base 10 symmetrically comprise two second rolling members 28, 30, coaxial with the first rolling members 20, 22, respectively, and shown in FIG. 2, to which reference is made now.

This FIG. 2 shows the bag from below in the direction of the arrow II represented in FIG. 1 and shows the base 10 more completely. This base 10 has a bearing face 32 from the four corners whereof the first and second roller members 20, 22, 28, 30 project.

Furthermore, and this is one feature of the invention, a rectilinear toothed portion 34 or rack is formed longitudinally in the bearing face 32 of the base 10 along an axis of symmetry A, parallel to and equidistant from the two lateral flanks 12, 14. This rectilinear toothed portion 34, which extends over all the length of the bearing face 32, is formed by providing slots 36 regularly spaced from each other along the axis of symmetry A. This rack 34 is therefore oriented in a direction corresponding to the direction in which the bag can be driven in translation over a particular surface thanks to the four rolling members 20, 22, 28, 30, resting on that particular surface, because their two transverse axes 24, 26 are perpendicular to the axis A of the rack 34.

A transverse groove 38 with transverse axis T is furthermore provided perpendicularly to the rack 34 and at equal distances from the two transverse axes 24, 26.

The function of the above rack 34 will now be described in more detail with reference to FIG. 3. This FIG. 3 shows part of the base 10 and its bearing face 32 in which the rack 34 and the transverse groove 38 are provided. Moreover, a driving pinion 46 is represented interengaged in the rack 34 at the level of the transverse groove 38. This driving pinion 46, the driving means whereof are not represented, has a rotation axis 48 oriented perpendicularly to the axis of symmetry A of the rack 34. As a result, the driving pinion 46 is adapted to drive the bag in translation along the axis of symmetry A in the direction of the arrow F when the driving pinion 46 is driven in rotation in the clockwise rotation direction R or in an opposite direction if the driving pinion 46 is driven in rotation in an opposite direction.

When the bag is placed on a particular surface, resting on its rolling members 20, 22, 28, 30, the bearing face 32 of the base 10 is therefore spaced from said particular surface, so that the forces to be produced to drive the bag in translation over that surface perpendicularly to the transverse axes 24, 26 are relatively low. As a result, by installing a driving pinion 46 under said particular surface so that its rotation axis 48 is parallel thereto, but the teeth whereof are adapted to project from that surface in order to interengage in the rack 34, mechanical drive means are produced for driving the bags in translation at lower energy cost.

In the example shown in this FIG. 3, the driving pinion 46 has six teeth and has dimensions such that only two teeth can interengage simultaneously in the rack 34. As a result, the bag can be driven in translation along the transverse axis T of the transverse groove 38, over said particular surface and parallel to the rotation axis 48 of the driving pinion 46, so that two teeth of the driving pinion 46 can slide freely in the transverse groove 38 on either side of the central tooth 44 and respectively between the two opposite edges 40, 42 of the transverse groove 38. The bag is therefore adapted to be driven freely in translation along the transverse axis T without the driving pinion 46 being able to block it.

However, and this is an advantage of the invention, if the bag is stopped in a position in which the driving pinion 46 lies on the axis of symmetry A of the rack 34, driving of the driving pinion 46 in rotation then causes driving of the bag, the driving pinion 46 then meshing in the rack 34.

A first installation according to the invention will now be described with reference to FIG. 4. This first installation is fitted into the hold 50 of an aircraft in order to be able to load it automatically, in particular with bags of the type cited above.

The hold 50 is divided into two superposed levels, an upper level 52 and a lower level 54, and the aircraft has a lateral opening 56 for loading it.

Along the axis of the lateral opening 56, the installation comprises a longitudinal transfer platform 58 equipped with two conveyor belts 60, 62 substantially parallel to each other and spaced from each other by a distance corresponding to the distance between the two transverse axes 24, 26 of the pairs of rolling members 20, 28 and 22, 26 of the bag 8 cited above. As a result, the bags can be supported transversely by the platform 58 so that their greater length 11 is oriented along the axis D of the aircraft perpendicularly to the conveyor belts 60, 62. In this way, the pair of rolling members 20, 28 with the transverse axis 24 bears on one of the conveyor belts 60 while the other pair of rolling members 22, 30 with the transverse axis 26 bears on the other conveyor belt 62.

Furthermore, the transfer platform 58 is equipped with rotary driving means formed here by driving pinions 64 similar to the driving pinion 46 represented in FIG. 3, and mounted and aligned between the two conveyor belts 60, 62 and regularly spaced from each other at a distance corresponding to the thickness 15 of the bags; the driving pinions 64 are all attached to a drive shaft that is not shown and extended parallel to the conveyor belts 60, 62 within the thickness of the transfer platform 58. The driving pinions 64 then project from the transfer platform 58 between the conveyor belts 60, 62.

The bags can therefore be driven due to the rotation of the conveyor belts 60, 62, which are themselves driven simultaneously at the same speed without the bearing face 32 of the bags being able to rub against another surface, as not only is the bearing face 32 held away from the transfer platform 58 thanks to the rolling members 20, 22, 28, 30, but the transverse groove 38 in the bags also provides a passage for the teeth of the driving pinions 64, as explained hereinabove with reference to FIG. 3.

Moreover, this first installation further includes a receiver platform 66 that borders the transfer platform 58 and is extended into the hold 50 of the aircraft perpendicularly to the transfer platform 58.

This receiver platform 66 is equipped with a plurality of drive members 68 also forming pinions, aligned and in line with each of the driving pinions 64 in a direction parallel to the axis D of the aircraft and perpendicular to the plane of the conveyor belts 60, 62. These drive members 68 are spaced from each other and, in the case of the first row 70, from the driving pinions 64 along the axis D of the aircraft by a distance corresponding to the length 11 of the bags.

This length, which also corresponds substantially to the length of the rack 34 of each of the bags, therefore enables the bags always to be interengaged with the driving pinions 64 or with the drive members 68. As a result, and as will be explained hereinafter, all of the bags disposed in rows can be driven in longitudinal translation over the transfer platform 58 due to the conveyor belts 60, 62.

FIG. 5 shows a second installation according to the invention for loading baggage transfer trolleys. This second installation comprises drive means analogous to the first installation.

This FIG. 5 shows part of a trolley 72 which comprises a second receiver platform 74 equipped with rows of second driving members 76. Moreover, a second transfer platform 78 borders the receiver platform 74. In exactly the same way, the second transfer platform 78 includes parallel second conveyor belts 80, 82 and second driving pinions 85 between the second conveyor belts 80, 82, spaced by a distance corresponding to the thickness 15 of a bag.

FIG. 6 will be referred to now, and shows the above two installations cooperating together to transfer rows of bags between the trolley 72 and the hold 50 of an aircraft.

FIG. 6 shows diagrammatically the hold 50 of an aircraft, in which the receiver platform 66 and a row of bags 84 resting on the receiver platform 66 are housed, at the border of the transfer platform 58, which they conceal. The row of bags 84 can be driven transversely in translation due to the drive members 68 over the receiver platform 66 along the axis D of the aircraft in the direction of the arrow X.

Moreover, FIG. 6 shows a loader 86, between the trolley 72 and the hold 50, having a transit platform 88 structurally analogous to the transfer platform 58 and equipped only with two parallel conveyor belts 90, 92 with no pinions. This transit platform 88 is arranged in line with the transfer platform 58 situated in the hold 50 of the aircraft in order to receive the rows of bags moving in longitudinal translation and is adapted to drive the rows of bags 84 over the second transfer platform 78. The rows of bags are of course driven longitudinally thanks to the conveyor belts in a direction V substantially perpendicular to the axis D of the aircraft.

The conveyor belts 90, 92 then drive the rows of bags longitudinally into the above trolley 72.

It will be noted that, in one mode of loading the hold of the aircraft, the installations operate with the driving directions of the conveyor belts, the driving means and the driving members reversed.

The above embodiment of the automatic processing installation processes and transfers bags having a rectilinear toothed portion adapted to be interengaged with toothed driving pinions. However, in another embodiment not only the driving pinions and the above drive members, but also the conveyor belts, are replaced by motorized rollers adapted to interengage by friction a rectilinear portion of the base of a bag.

FIG. 7 may be referred to, which shows driving elements 100 replacing the driving pinions and the conveyor belts. These driving elements 100 have a first pivoting roller 102 in an inactive position, accommodated inside a first open housing 101 formed in a transfer platform 58', and a second pivoting roller 104 also in an inactive position but perpendicular to the first roller 102, housed inside a second open housing 106 formed in said transfer platform 58' in the vicinity of the first open housing 101. When the first pivoting roller 102 is moved into an active position, with the second pivoting roller 104 remaining in its inactive position, not only is it flush with the surface of the transfer platform 58' but it is furthermore driven in rotation, one way or the other, here to drive in a longitudinal direction V' a bag the base whereof resting on the transfer platform 58' covers the two driving elements 100 completely and comes into contact with the first pivoting roller 102. Moreover, if the second pivoting roller 104 is in turn moved into an active position, the first pivoting roller 102 remaining in its inactive position, it drives a bag resting on it in translation in a transverse direction X' perpendicular to the longitudinal direction V'. Thus by equipping a transfer platform 58' with a plurality of driving elements 100 corresponding to a plurality of bags of a row of bags resting on the transfer platform 58', said row can be driven in translation either in a longitudinal direction parallel to the transfer platform 58' or in a transverse direction perpendicular to said transfer platform 58'.

Furthermore, and in another embodiment of the invention, shown in FIG. 8, the trolley 72 and the loader 86 shown in FIG. 6 are combined in a single automobile vehicle 110 adapted to load and to offload bags in rows. This automobile vehicle 110 is equipped with a removable stowage rack 112 adapted to receive the rows of bags.

This FIG. 8 shows diagrammatically and in part a hold 50' of an aircraft having an upper level 52' and a lower level 54' as well as a lateral opening 56' for loading and offloading. There is also shown a longitudinal transfer platform 58' for each of the levels 52' and 54', and rows of bags 84' already installed in the hold 50', on each level 52', 54' and resting on receiver platforms 66' that border the transfer platforms 58'. The latter are equipped with the above driving elements 100 and the receiver platforms 66' are also equipped with drive rollers that are not apparent in FIG. 8.

The rows of bags 84' are therefore here drivable in translation in a transverse direction X' over the receiver platforms 66' and then in a perpendicular longitudinal direction V' over the transfer platform 58' to the stowage rack 112.

Here, when the hold 50' of the aircraft is entirely unloaded and the stowage rack 112 is entirely full, the automobile vehicle 110 can be moved to an air terminal to place the stowage rack 112 on the ground at a location where passengers can take their bags resting therein, in exactly the same position as that in which they placed them.

Furthermore, in a further embodiment, the bags are transferred into and installed in the hold of an aircraft in containers. These containers are then similar to the trolley 72 shown in FIG. 5 and are loaded directly into the hold of the aircraft.

In a variant, shown in FIG. 9, the installation according to the invention further comprises a plurality of transfer pallets 120 bordered by two opposite rims 121 and respectively adapted to receive bags 122 in two matched rows 124, 126. The bags 122 further have a top holding wall 128 and two edge walls 130. The bags of the two matched rows 126, 124 here have one of their edge walls 130 and their top holding wall 128 free.

In this same variant, the transfer pallets are, in an embodiment not shown, without opposed rims, but are instead equipped with means for attaching the bags in rows to them. Those means include grooves and ribs adapted to cooperate with the base of the bags to block them in translation relative to the transfer pallet, while said bags have lockable clipping means adapted to interengage with said transfer pallet to fasten them to that pallet. Furthermore, these clipping means can be locked by means of a key-operated lock or a magnetically controlled lock so that only the holder of the key or the magnetic badge corresponding to said lock can remove the bags.

FIG. 10 shows a stowage rack 132 adapted to receive a plurality of transfer pallets 120 on three superposed levels, a lower level 134, an intermediate level 136 and an upper level 138. The transfer pallets 120 are mounted in said stowage rack 132 to be mobile in translation along a longitudinal axis A while the superposed levels 134, 136, 138 are mounted so as to be mobile in translation vertically, perpendicularly to the longitudinal axis A. Furthermore, the stowage rack 132 has two opposed open lateral bays 140, 142, a closed rear portion 144 and an open front portion 146, through which the transfer pallets 120 can be driven in translation.

Thus bags can be stowed manually, flank against flank, through each of said bays 140, 142, on each side of the stowage rack 132 and inside the transfer pallets 120 on said superposed levels 134, 136, 138, so that the flanks of said bags are perpendicular to the longitudinal axis A and so as to form said rows. As a result, the three levels 134, 136, 138 being spaced from each other by a significantly greater distance than the bags, and the lower level 134 lying close to the ground, the persons carrying the bags can easily install their bags through the open bays 140, 142 onto the three superposed levels 134, 136, 138 to form the rows.

Moreover, according to the embodiment cited above and not shown, in which the transfer pallets have no rims, but are instead equipped with means for clipping on the bags, the latter can be locked by the persons carrying the bags themselves and at the same time be checked in electronically. To this end the bags are equipped with electronic information storage means for storing in particular an identifier and these electronic storage means are extended by first connection means. The stowage rack itself has a cable network terminated by second connection means adapted to cooperate with each of the first connection means of the bags, for example to come into contact with them, when they are locked onto the transfer pallet, the cable network being connected to an electronic data processing terminal. Accordingly, when the person carrying the bag is checked in, the bag that corresponds to him and that is then locked onto a transfer pallet is simultaneously associated with him in real time. As a result, to each bag locked onto the transfer pallets there corresponds a checked-in person carrying the bag and to each checked-in person carrying a bag there corresponds at least one bag locked onto the transfer pallets.

These transfer pallets 120 are adapted to be driven in rotation from the stowage rack 132 to the transfer platforms 152, 154 situated inside a hold via transit platforms 146 that are shown in FIG. 11. This FIG. 11, showing part of the hold 150 of an aircraft, shows an upper transfer platform 152 and a lower transfer platform 154 bordering the upper receiver platform 156 and the lower receiver platform 158, respectively.

The transfer pallets 120 containing matched rows of bags can therefore be driven in translation over the transit platforms 146 in a longitudinal direction V' corresponding to the longitudinal axis A of the stowage rack 132 that extends from those transit platforms 146 and then over the transfer platforms 152, 154 to be thereafter driven in translation in a transverse direction X' perpendicular to the longitudinal direction V' over the receiver platforms 156, 158.

Obviously, the reverse routing of the transfer pallets 120 from the hold 150 to the stowage rack 132 is used when the aircraft is offloaded after landing.

The invention claimed is:

1. A method for automatically processing individual hand-held bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags;

wherein the method comprises the following steps:

forming rows of bags resting on their base on one of said storage areas, the bags of each of said rows being pressed against a neighboring row, such that the bags of each row are pressed flank to flank with the bags of the neighboring row, and in a direction substantially normal to said flanks;

driving each of said rows sequentially in translation in a first direction over said longitudinal transfer platform so that each of said rows of bags extends longitudinally on said platform; and driving each of said rows of bags supported by said platform in a second direction substantially perpendicular to said first direction to transfer said rows of bags to the other storage area, wherein said other storage area is situated in an aircraft and said one storage area is situated outside said aircraft.

2. The method as claimed in claim 1 for automatically processing bags, wherein said first direction is substantially perpendicular to the flanks of the bags of said row, while said second direction is substantially parallel to the flanks of the bags of said row.

3. The method as claimed in claim 1 of automatically processing bags, wherein, said bags have two opposed edge walls respectively connecting said lateral flanks, said two edge walls and said lateral flanks being surmounted by a holding wall opposite said base, said rows of bags being formed one above the other and at a distance leaving said holding wall and at least one of said edge walls of each of said bags free.

4. The method as claimed in claim 3 of automatically processing bags, wherein said storage area includes a stowage rack for forming said rows of bags one above the other, said rows of bags being formed one above the other in said stowage rack, such that said rows are matched, the matched rows being arranged so that the edge walls of the bags of the matched rows are facing in a direction perpendicular to the direction of the matched rows.

5. The method as claimed in claim 4 of automatically processing bags, wherein said matched rows are driven sequentially.

6. A system for automatically processing individual hand-held bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags;

wherein said system comprises:

means for forming rows of bags resting on their base, on one of said storage areas, the bags of each of said rows being pressed against a neighboring row, such that the bags of each row are pressed flank to flank with the bags of the neighboring row, and in a direction substantially normal to said flanks;

means for driving each of said rows sequentially in translation in a first direction over said longitudinal transfer platform so that each of said rows of bags extends longitudinally on said platform; and, means for driving each of said rows of bags supported by said platform in translation in a second direction substantially perpendicular to said first direction to transfer said row of bags to the other storage area, wherein said other storage area is situated in an aircraft and said one storage area is situated outside said aircraft.

7. The system as claimed in claim 6 for automatically processing bags, wherein, said bags have two opposed edge walls respectively connecting said lateral flanks, said two edge walls and said lateral flanks being surmounted by a holding wall opposite said base, said system comprising a stowage rack for forming said rows of bags one above the other and at a distance leaving said holding wall and at least one of said edge walls of each of said bags free.

8. The system as claimed in claim 7 for automatically processing bags, wherein said stowage rack extends along a longitudinal axis and comprises at least two superposed levels and at least one open lateral bay, so that bags can be stowed manually flank against flank on said levels via said bay so that the flanks of said bags are substantially perpendicular to said axis so as to form said rows.

9. The system as claimed in claim 6 for automatically processing bags, wherein said system comprises longitudinal driving means for driving said rows substantially perpendicularly to the flanks of the bags of said rows, said longitudinal driving means being adapted to drive said rows of bags in said first direction.

10. The system as claimed in claim 6 for automatically processing bags, wherein said system comprises transverse driving means for driving said rows transversely, said transverse driving means being adapted to drive said rows of bags in said second direction.

11. The system as claimed in claim 6 for automatically processing bags, wherein said system further comprises transfer pallets adapted to receive said rows of bags, said transfer pallets being mounted to be mobile in translation in said stowage rack.

12. The system as claimed in claim 6 for automatically processing bags, wherein, said bags have two opposed edge walls respectively connecting said lateral flanks, said two edge walls and said lateral flanks being surmounted by a holding wall opposite said base, said system comprising a stowage rack for forming said rows of bags one above the other and at a distance leaving said holding wall and at least one of said edge walls of each of said bags free.

13. A system for automatically processing individual handheld bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags;

wherein said system comprises:

means for forming rows of bags resting on their base, on one of said storage areas, the bags of each of said rows being pressed against a neighboring row, such that the bags of each row are pressed flank to flank with the bags of the neighboring row, and in a direction substantially normal to said flanks;

means for driving each of said rows sequentially in translation in a first direction over said longitudinal transfer platform so that each of said rows of bags extends longitudinally on said platform; and means for driving each of said rows of bags supported by said platform in translation in a second direction substantially perpendicular to said first direction to transfer said row of bags to the other storage area, wherein said bags have two opposed edge walls respectively connecting said lateral flanks, said two edge walls and said lateral flanks being surmounted by a holding wall opposite said base, said system comprising a stowage rack for forming said rows of bags one above the other and at a distance leaving said holding wall and at least one of said edge walls of each of said bags free;

wherein said stowage rack extends along a longitudinal axis and comprises at least two superposed levels and at least one open lateral bay, so that bags can be stowed manually flank against flank on said levels via said bay so that the flanks of said bags are substantially perpendicular to said axis so as to form said rows; and wherein said stowage rack comprises two opposed open lateral bays, so that bags can be stowed manually via each of said bays on each side of the stowage rack to match up said rows.

14. A system for automatically processing individual handheld bags between two storage areas, the bags respectively having a base surmounted by two opposed lateral flanks said bags being adapted to rest in equilibrium on their base, said bags being transferred from one storage area to the other via a longitudinal transfer platform, said longitudinal transfer platform being adapted to support said bags;

wherein said system comprises:

means for forming rows of bags resting on their base, on one of said storage areas, the bags of each of said rows being pressed against a neighboring row, such that the bags of each row are pressed flank to flank with the bags of the neighboring row, and in a direction substantially normal to said flanks means for driving each of said rows sequentially in translation in a first direction over said longitudinal transfer platform so that each of said rows of bags extends longitudinally on said platform; and means for driving each of said rows of bags supported by said platform in translation in a second direction substantially perpendicular to said first direction to transfer said row of bags to the other storage area, wherein said system comprises longitudinal driving means for driving said rows substantially perpendicularly to the flanks of the bags of said rows, said longitudinal driving means being adapted to drive said rows of bags in said first direction; and wherein said longitudinal driving means comprise at least two substantially parallel conveyor belts spaced from each other.

15. A system for automatically processing individual handheld bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags;

wherein said system comprises:

means for forming rows of bags resting on their base, on one of said storage areas, the bags of each of said rows being pressed against a neighboring row, such that the bags of each row are pressed flank to flank with the bags of the neighboring row, and in a direction substantially normal to said flanks, means for driving each of said rows sequentially in translation in a first direction over said longitudinal transfer platform so that each of said rows of bags extends longitudinally on said platform; and means for driving each of said rows of bags supported by said platform in translation in a second direction substantially perpendicular to said first direction to transfer said row of bags to the other storage area, wherein said system comprises transverse driving means for driving said rows transversely, said transverse driving means being adapted to drive said rows of bags in said second direction; and wherein said transverse driving means comprise rotary driving means adapted to interengage in said bases to drive simultaneously each of the bags of said row of bags.

16. A system for automatically processing individual handheld bags between two storage areas the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags;

wherein said system comprises:

means for forming rows of bags resting on their base, on one of said storage areas, the bags of each of said rows being pressed against a neighboring row, such that the bags of each row are pressed flank to flank with the bags of the neighboring row, and in a direction substantially normal to said flanks;

means for driving each of said rows sequentially in translation in a first direction over said longitudinal transfer platform so that each of said rows of bags extends longitudinally on said platform; and means for driving each of said rows of bags supported by said platform in translation in a second direction substantially perpendicular to said first direction to transfer said row of bags to the other storage area, wherein said bases comprise a rectilinear toothed portion and said rotary drive means include driving pinions adapted to mesh in said rectilinear toothed portion.

17. A system for automatically processing individual handheld bags between two storage areas, the bags respectively having a base surmounted by two opposed lateral flanks, said bags being adapted to rest in equilibrium on their base, said bags being transferred from one storage area to the other via a longitudinal transfer platform, said longitudinal transfer platform being adapted to support said bags;

wherein said system comprises:

means for forming rows of bags resting on their base, on one of said storage areas, the bags of each of said rows being pressed against a neighboring row, such that the bags of each row are pressed flank to flank with the bags of the neighboring row, and in a direction substantially normal to said flanks, means for driving each of said rows sequentially in translation in a first direction over said longitudinal transfer platform so that each of said rows of bags extends longitudinally on said platform; and means for driving each of said rows of bags supported by said platform in translation in a second direction substantially perpendicular to said first direction to transfer said row of bags to the other storage area, wherein, said bags have an identical thickness, said transfer platform being equipped with a plurality of consecutive rotary driving means spaced longitudinally by a distance corresponding to said thickness.

18. The system as claimed in claim 17 for automatically processing bags, wherein said rotary drive means of said plurality of rotary drive means are connected together by a single common drive shaft.

* * * * *